(12) United States Patent
Meusel et al.

(10) Patent No.: US 8,382,178 B2
(45) Date of Patent: Feb. 26, 2013

(54) ROBOTIC FINGER AND ROBOTIC HAND

(75) Inventors: Peter Meusel, Fürstenfeldbruck (DE); Hong Liu, Wesseling (DE)

(73) Assignee: Deutsches Zentrum fur Luft-und Raumfahrt E.V., Cologne (DE)

( * ) Notice: Subject to any disclaimer, the term of this patent is extended or adjusted under 35 U.S.C. 154(b) by 185 days.

(21) Appl. No.: 12/992,010

(22) PCT Filed: May 15, 2009

(86) PCT No.: PCT/EP2009/055923
§ 371 (c)(1),
(2), (4) Date: Nov. 10, 2010

(87) PCT Pub. No.: WO2009/138492
PCT Pub. Date: Nov. 19, 2009

(65) Prior Publication Data
US 2011/0068593 A1 Mar. 24, 2011

(30) Foreign Application Priority Data
May 16, 2008 (DE) .......................... 10 2008 023 926

(51) Int. Cl.
*B66C 1/00* (2006.01)
*B66C 1/42* (2006.01)
(52) U.S. Cl. ...................................... 294/106
(58) Field of Classification Search ............... 294/106; 623/63, 64; 901/38
See application file for complete search history.

(56) References Cited

U.S. PATENT DOCUMENTS

| | | | | |
|---|---|---|---|---|
| 4,351,553 A | * | 9/1982 | Rovetta et al. | 294/106 |
| 4,623,183 A | * | 11/1986 | Aomori | 294/86.4 |
| 5,656,904 A | * | 8/1997 | Lander | 318/568.12 |
| 7,942,895 B2 | * | 5/2011 | Jinno et al. | 606/205 |
| 2002/0060465 A1 | * | 5/2002 | Laliberte et al. | 294/106 |
| 2007/0063523 A1 | * | 3/2007 | Koyama | 294/106 |

FOREIGN PATENT DOCUMENTS

| | | |
|---|---|---|
| DE | 20 2005 020 915 | 12/2006 |
| JP | 01027880 | 1/1989 |

OTHER PUBLICATIONS

Gao X H et al.; "*The Hit/DLR Dexterous Hand: work in progress*"; Proceedings of the 2003 IEEE International Conference on Robotics and Automation ICRA 2003; Sep. 2003; pp. 3164-3168.
International Search Report dated Sep. 8, 2009 for PCT/EP2009/055923.
International Preliminary Report on Patentablility (IPRP) dated Dec. 16, 2010 for PCT/EP2009/055923.

* cited by examiner

*Primary Examiner* — Dean Kramer
*Assistant Examiner* — Stephen Vu
(74) *Attorney, Agent, or Firm* — Ohlandt, Greeley, Ruggiero & Perle, LLP

(57) ABSTRACT

A robotic finger is provided that includes a base joint connected to a base member. By way of the base joint, a main finger member is connected to the base member for pivoting movements of the main finger member in two planes. The base joint has two driven main bevel gears opposite one another, and two likewise opposing intermediate bevel gears disposed between the main bevel gears. The main bevel gears are mounted rotatably at the base member and can be driven independently of one another through electric motors and an intermediate toothed belt. The two intermediate bevel gears are each rotatably mounted at support members connected to the main finger member. To protect the base joint, a curved cover bracket is provided.

15 Claims, 3 Drawing Sheets

ROBOTIC FINGER AND ROBOTIC HAND

BACKGROUND

1. Field of the Disclosure

The disclosure relates to a robot finger and a robot hand.

2. Discussion of the Background Art

Robot hands are modeled after the human hand and comprise a hand base substantially corresponding to the palm of the human hand. To said hand base, at least one and, normally, a plurality of robot fingers are fastened. The robot fingers comprise a plurality of finger limbs which are likewise modeled after the human fingers. By way of a base joint, a main finger member is fastened directly to the hand base or to a base member of the robot finger. In this configuration, said base joint is the finger joint arranged closest to the hand base. The base joint is designed to allow movement of said main finger member in two planes. Further, in a manner corresponding to the closing or opening of the hand, the main finger member can also be turned or pivoted about a main pivot axis. Vertically thereto, the main finger member can normally be moved laterally by about 10° to 20° in both directions. Thus, the robot finger can be moved within spatial limits corresponding to those of the moving range of a human finger. It is known to provide the base joint as a joint comprising two pairs of bevel gears. The two main bevel gears of the base joint are arranged opposite to each other and can be driven independently of each other. Rotation of the main bevel gears about the main rotational axis will cause a turning or pivoting of the fingers corresponding to the opening or closing of the hand. Between the two main bevel gears and vertically to them, two intermediate bevel gears are arranged. By rotating the main bevel gears with different rotational speeds and/or in opposite directions, there is effected a lateral pivoting movement of the robot finger and the main finger joint of the robot finger. The two main bevel gears are driven by a respective electric motor via a transmission such as e.g. a toothed belt. Said electric motors are preferably arranged on the base member of the robot finger or integrated therein.

When a gripping action is performed by a robot hand, counterforces opposed to the holding forces will occur particularly at the fingertips. These counterforces have to be transmitted via the base joint to the base member of the robot finger and/or to the hand base of the robot hand. Due to the provision of bevel gears, the influence of such forces onto the intermediate bevel gears has the consequence that the base joint will be pressed apart. As a result, the abutment faces between the teeth of the bevel gears that are effective for force transmission will become smaller, which in turn may entail damage to the bevel gears. In this regard, it may even happen that a tooth will be skipped or the base joint will become jammed. Further, irrespective of the force transmission problem, there is a danger of foreign bodies intruding into the bevel gear, thus causing the bevel gears to jam or to become damaged.

It is an object of the disclosure to provide a robot finger wherein the danger of damage to the base joint due to the occurring forces and/or due to contamination is avoided.

SUMMARY

The robot finger of the disclosure comprises, in the region of the base joint, a cover bracket. Said cover bracket extends between two holding members supporting the intermediate bevel gears, at the least one of the intermediate bevel gears being fixedly attached to the holding member. Since the cover bracket connects the two holding members to each other, the cover bracket is able to take up forces. This has the effect of reducing the danger of the intermediate bevel gears being pressed apart in case that relatively large forces are received. Further, according to the disclosure, the cover bracket is arranged in such a manner that the bevel gears are at least partially covered so that the danger of ingress of contamination is reduced.

Preferably, the cover bracket is arc-shaped, and particularly is shaped as ring segment. Thus, according to the disclosure, the cover bracket extends in the shape of an arc from one holding member to the other, said arc preferably covering an angle larger than 180°. Thereby, it is guaranteed that, particularly when the rotor finger is turned or pivoted about the main rotational axis, that the cover bracket will substantially fully cover the base joint in the various finger positions. The arc of the cover bracket preferably extends in the pivoting plane. Due to the fact that, according to the disclosure, the cover bracket is connected to the holding members of the intermediate bevel gears, the cover bracket will be pivoted along during a rotating or swiveling movement of the rotor finger about the main rotational axis.

Since, when a gripping action is performed by the robot hand, the forces acting onto the intermediate bevel gears are directed toward the outside and thus will press apart the mutually opposite intermediate bevel gears, it is particularly preferred that the cover bracket is arranged on preferably both outer sides of the holding members, preferably in abutment thereon. Thus, in case that the intermediate bevel gears would be pressed apart, the holding bracket would be bent open. Thus, the holding bracket can reduce the danger that the two intermediate bevel gears could be pressed apart. Accordingly, the risk of damage to the base joint is considerably diminished.

When the robot finger performs a lateral pivoting movement, i.e. a pivoting movement about the second rotational axis, it is preferred that the cover bracket is not pivoted along with the robot finger. According to a preferred embodiment of the disclosure, this is accomplished in that the cover bracket is arranged in a pivotable manner on the holding members of the intermediate bevel gears. This allows for a particularly compact constructional design of the robot finger in the region of the base joint. If the cover bracket would be pivoted along with the robot finger during lateral movement of the latter, a corresponding space would have to be provided for the cover bracket. The provision of such a space would result in a gap which would allow an ingress of impurities into the base joint.

According to a preferred embodiment, the preferably arc-shaped cover bracket is configured to be open in the direction of the main finger member. This is possible because the cover bracket, when being pivoted as occurring during the opening and closing movement of the robot hand, will open on the side facing toward the base member and not on the side facing towards the main finger member. Thereby, the assembly process is facilitated and a space-saving arrangement is realized.

According to a preferred embodiment of the disclosure, the cover bracket is arranged to protrude between the mutually confronting main bevel gears. With particular preference, in this regard, the side faces—preferably both side faces—of the cover bracket which are facing in the direction of the main bevel gears, are formed with a bevel. Preferably, said bevel extends parallel to the tooth flanks of the respective main bevel gears. Realized thereby is an extremely small gap between the cover bracket and the bevel gears, thus further lowering the risk of ingress of impurities. Thus, according to a preferred embodiment, the cover bracket is substantially trapezoidal in cross section, while the outer side and/or also the inner side of the cover bracket can be curved. Particularly, the outer side can be convex and the inner side can be concave.

According to a particularly preferred embodiment, the holding members are connected to each other not only by the cover bracket provided according to the disclosure but additionally via a connection member. Preferably, this will be a web-shaped connection member arranged within the course of the main finger member and again serving for taking up forces and respectively for folding the holding members together. Particularly, the two holding members and the connection member are formed as a one-pieced component. According to a preferred embodiment, the connection member thus forms an inner holding arc for force take-up or force transmission, and the cover bracket forms an outer holding arc for force take-up or force transmission.

The disclosure further relates to a robot hand comprising a hand base configured in imitation of the palm of the human hand. Connected to said hand base are at least one and preferably a plurality of robot fingers, particularly at least two robot fingers, as has been described above.

The disclosure will be explained in greater detail hereunder by way of a preferred embodiment thereof, with reference to the accompanying drawings.

DETAILED DESCRIPTION OF THE PREFERRED EMBODIMENT

Figure 1:
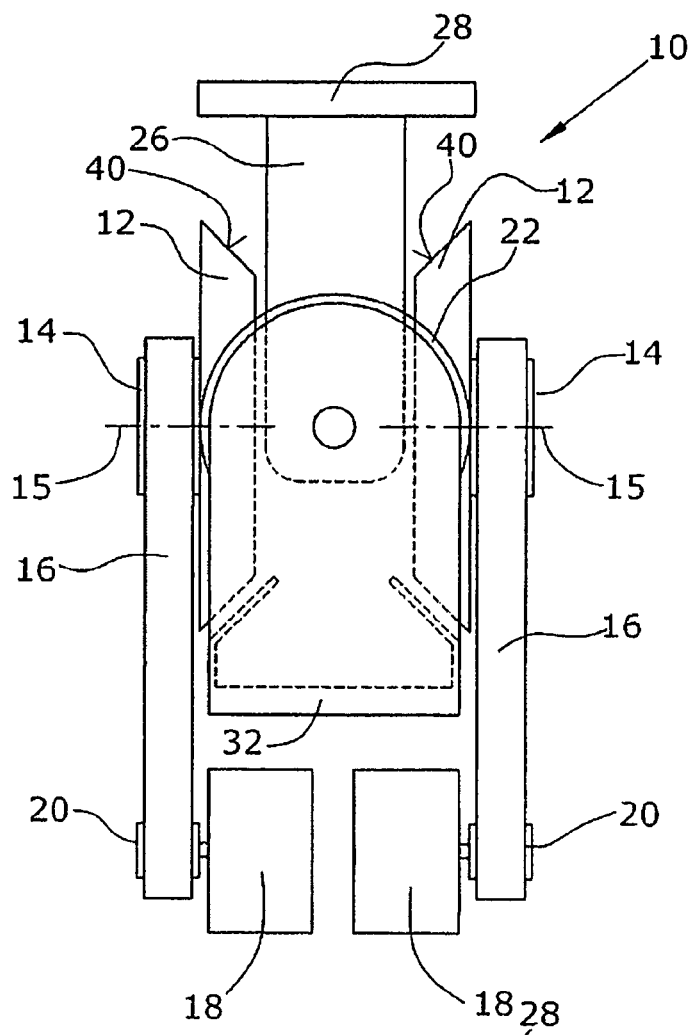
FIG. 1 is a schematic plan view of a base joint of a robot finger.

A base joint 10 comprises two mutually opposite main bevel gears 12. In the illustrated embodiment, said bevel gears are each provided with a respective outward projection 14 with toothing and are rotatable independently of each other about a main rotational axis 15.

Each projection 14 is engaged by a toothed belt 16. Said toothed belts 16 are connected to respective electric motors 18. Each of said electric motors 18 is operative to drive a respective gear 20 engaging one of said toothed belts 16. The electric motors 18 are fixed to a base member, not illustrated.

Together with the two main bevel gears 12 which can be driven independently of each other, two intermediate bevel gears 22 are provided. Said two intermediate bevel gears 22 are arranged, also opposite to each other, in planes extending vertically to the planes of the main bevel gears 12. The two intermediate bevel gears 22 are connected via a respective second rotational axis 24 to a holding member 26. The two holding members 26 are fixedly connected to each other by a connection member 28 so that the two holding members 26 together with the connection member 28 form a U-shaped holding structure, the latter being preferably formed in one piece. Connected to the holding members 26 and respectively to said connection member 28 is a main finger member 56. Said main finger member 56 carries e.g. drive elements for the next finger member 62.

Figure 2:
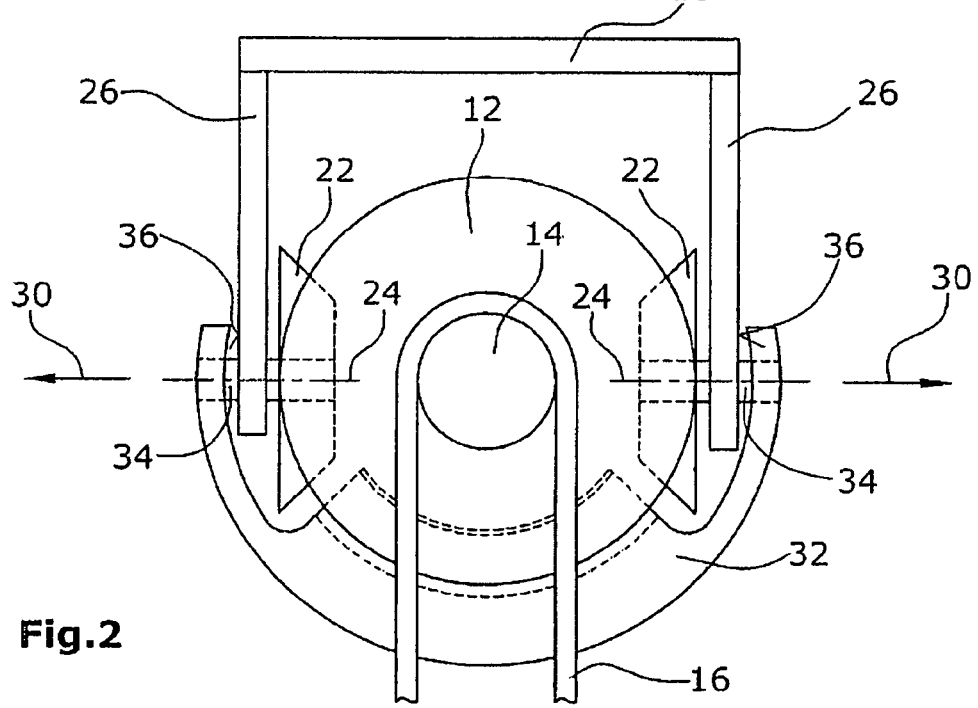
FIG. 2 is a schematic lateral view of a base joint of a robot finger.
Figure 3:
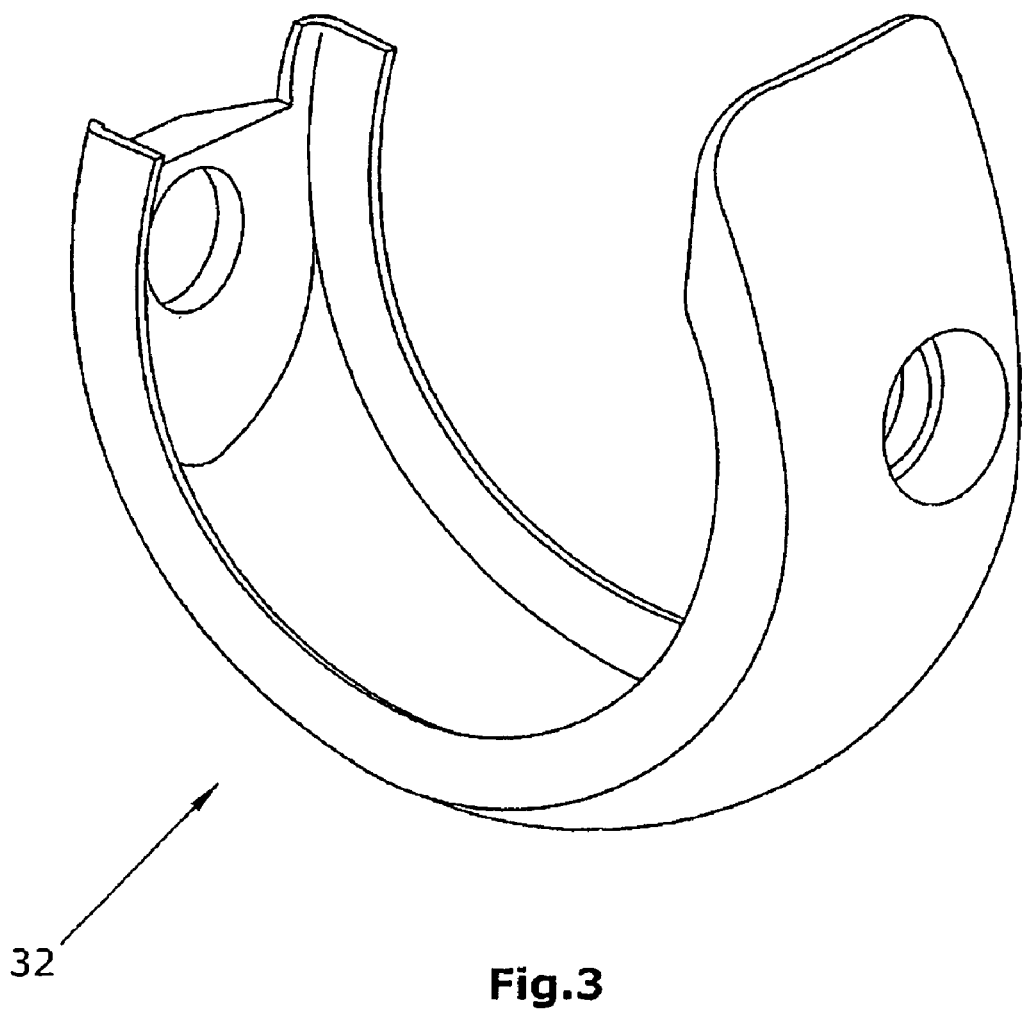
FIG. 3 is a schematic perspective view of a cover bracket.
Figure 4:
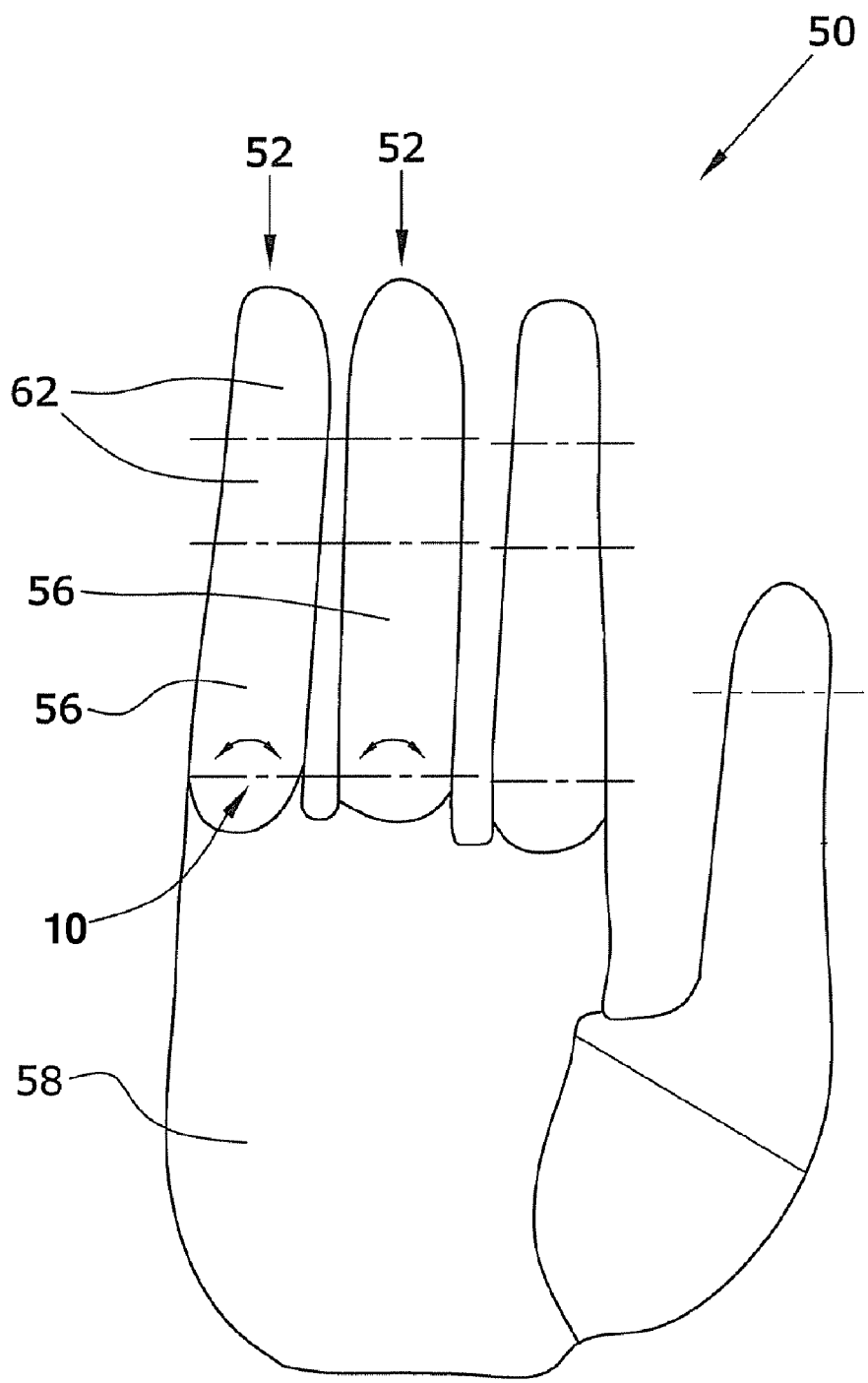
FIG. 4 is a schematic view of a robot hand.

When performing a gripping action by means of a robot hand 50 (FIG. 3) comprising at least two robot fingers 52, forces will act toward the outside in the direction indicated by arrows 30 (FIG. 2 and FIG. 3). Under the effect of these forces, the second bevel gears 22 will be spread apart. According to the disclosure, to reduce this risk of such a spread-apart movement and the problems resulting therefrom, a cover bracket 32 is provided. Said cover bracket 32 has the shape of an arc. The cover bracket 32 is pivotally supported on pins 34 of second rotational axis 24. Thus, the cover bracket 32 is pivotable about the second rotational axis 24 while the latter, however, is not held for displacement in the direction of said arrows 30, thus making it possible that the cover bracket 32 takes up forces acting in the direction of arrows 30. Cover bracket 32 is arranged in the region of the two outer sides 36 of the holding members 26 and is in abutment on these outer sides. The sides 38 of the cover bracket which are facing in the direction of the main bevel gears 12 can be beveled and then extend preferably parallel to the flanks 40 of main bevel gears 12. Cover bracket 32 can thus partially project into the region of the main bevel gears 12.

The invention claimed is:

1. A robot finger comprising
a main finger member connected to a base member via a base joint, said main finger member being connected to said base member for pivoting movement in two planes, and
said base joint comprising two driven, mutually confronting main bevel gears supported for rotation on the base member, and said base joint further comprising two intermediate bevel gears arranged between the main bevel gears and being each held on a holding member of the main finger member, wherein
a cover bracket extending from one of said holding members to the other holding member, wherein said cover bracket extends between the main bevel gears.

2. The robot finger according to claim 1, wherein said cover bracket is shaped as a ring segment.

3. The robot finger according to claim 1, wherein said cover bracket is arranged in abutment on an outer side of each holding members.

4. The robot finger according to claim 1, wherein said cover bracket is connected to the holding members for pivotal movement about a second rotational axis of the respective intermediate bevel gear.

5. The robot finger according to claim 1, wherein said cover bracket is open in the direction of the main finger member.

6. The robot finger according to claim 1, wherein the cover bracket has a side face facing in the direction of the main bevel gears that is beveled, said side face extending substantially parallel to a tooth flank of the corresponding main bevel gear.

7. The robot finger according to claim 1, wherein said cover bracket has a substantially trapezoidal cross section.

8. The robot finger according to claim 1, wherein the main bevel gears are rotatable on a common rotational axis but independently of each other.

9. The robot finger according to claim 1, wherein the intermediate bevel gears are rotatable on a common rotational axis but independently of each other.

10. The robot finger according to claim 1, wherein the holding elements are connected to each other via a connection member and are formed in one piece.

11. The robot finger according to claim 1, wherein the main bevel gears can be driven independently of each other by a respective drive motor arranged on the base member.

12. The robot finger according to claim 1, wherein at least one further finger member is articulated to the main finger member.

13. A robot hand comprising a hand base and a plurality of robot fingers according to claim 1 that are connected to said hand base.

14. A robot hand comprising
a hand base, and
a plurality of robot fingers that are connected to said hand base, wherein each robot finger comprises:
a main finger member connected to a base member via a base joint, said main finger member being connected to said base member for pivoting movement in two planes, and
said base joint comprising two driven, mutually confronting main bevel gears supported for rotation on the base member, and said base joint further comprising two intermediate bevel gears arranged between the main bevel gears and being each held on a holding member of the main finger member, wherein
a cover bracket extending from one of said holding members to the other holding member.

15. A robot finger comprising
a main finger member connected to a base member via a base joint, said main finger member being connected to said base member for pivoting movement in two planes, and
said base joint comprising two driven, mutually confronting main bevel gears supported for rotation on the base member, and said base joint further comprising two intermediate bevel gears arranged between the main bevel gears and being each held on a holding member of the main finger member, wherein
a cover bracket extending from one of said holding members to the other holding member, wherein the cover bracket has a side face facing in the direction of the main bevel gears that is beveled, said side face extending substantially parallel to a tooth flank of the corresponding main bevel gear.

* * * * *